United States Patent [19]

Livet

[11] Patent Number: 4,595,170
[45] Date of Patent: Jun. 17, 1986

[54] SOLENOID VALVE

[75] Inventor: Jean Livet, Geneva, Switzerland

[73] Assignee: Honeywell Lucifer S.A., Switzerland

[21] Appl. No.: 642,856

[22] Filed: Aug. 21, 1984

[30] Foreign Application Priority Data

Aug. 19, 1983 [CH] Switzerland .................. 4527/83

[51] Int. Cl.$^4$ ............................................. F16K 31/06
[52] U.S. Cl. ........................... 251/129.05; 251/129.01;
251/129.07; 251/129.08; 251/129.22
[58] Field of Search ............ 251/140, 129, 139, 129.07,
251/129.22, 129.05, 129.08, 129.01

[56] References Cited

U.S. PATENT DOCUMENTS

| | | | |
|---|---|---|---|
| 3,441,246 | 4/1969 | Lauppe et al. | 251/129 X |
| 3,470,892 | 10/1969 | Barker | 251/141 X |
| 3,653,630 | 4/1972 | Ritsema | 251/129 |
| 4,210,311 | 7/1980 | Stone | 251/129 |
| 4,376,447 | 3/1983 | Chumley | 251/141 X |

Primary Examiner—Arnold Rosenthal
Attorney, Agent, or Firm—Mitchell J. Halista; Trevor B. Joike

[57] ABSTRACT

A solenoid valve includes a valve body (3), a ferromagnetic fluid flow damper (4) cooperating with a seat (6), to form a fluid sealing surface, an electromagnetic field coil (11) for selectively displacing the damper (4) against the action of a spring (7) by a magnetic field produced by an energization of the coil, an intake conduit (19) and an outlet conduit (20). The valve body (3) is housed in a cylindrical chamber (2) of a hydraulic unit (1) with an internal fluid intake pipe (14) and an internal fluid outlet pipe (22), communicating with their respective fluid intake (19) and outlet (20) conduits in the valve body (3). A flexible joint (16) connects the wall of the cylindrical chamber (2) with the rim of the intake conduit (19) and a compression spring (23) is located between the lower side (24) of the body (3) and the hydraulic unit (1) to provide an elastic suspension for the body (3). This arrangement enables gradual interruption of the flowing liquid when the valve closes by the damper (4) being impelled into the seat (6) by the spring (7) to eliminate water hammer. It is thus possible to regulate pressure in an fluid bypass application installation following a linear function of the ratio of the valve opening time to the total current cycle supplying the coil (11).

12 Claims, 6 Drawing Figures

SOLENOID VALVE

BACKGROUND OF THE INVENTION

Field of the Invention

This relates to an electromagnetic solenoid valve. More specifically, the present invention is directed to a solenoid valve having a valve body, a ferromagnetic fluid flow damper displaceable in an axial direction in a bore in the body by the effect of a magnetic field produced by the energization of an electrical coil and cooperating with a seat in the body between fluid intake conduit and a fluid outlet conduit provided in the body to form a fluid sealing surface.

SUMMARY OF THE INVENTION

An object of the present invention is to provide an improved solenoid valve.

In accomplishing this and other objects, there has been provided, in accordance with the present invention, a solenoid valve including a valve body, a magnetic field coil, a fluid flow damper selectively displaceable in an axial direction in a bore in the body under the effect of a magnetic field produced by an energization of the electrical coil and cooperating with a seat in the body between a fluid intake conduit and a fluid outlet conduit provided in the body to form a fluid sealing surface, characterized by a cylindrical chamber in which the valve body is housed in a displaceable manner along said axial direction; a fluid intake pipe and a fluid outlet pipe for said cylindrical chamber; and at least one elastic joint tightly uniting the wall of the cylindrical chamber and said valve body so as to separate said intake conduit and pipe from said outlet conduit and pipe.

BRIEF DESCRIPTION OF THE DRAWINGS

A better understanding of the present invention may be had, when the following detailed description is read in connection with the accompanying drawings in which.

DESCRIPTION OF THE PREFERRED EMBODIMENT

Detailed Description

Figure 1:
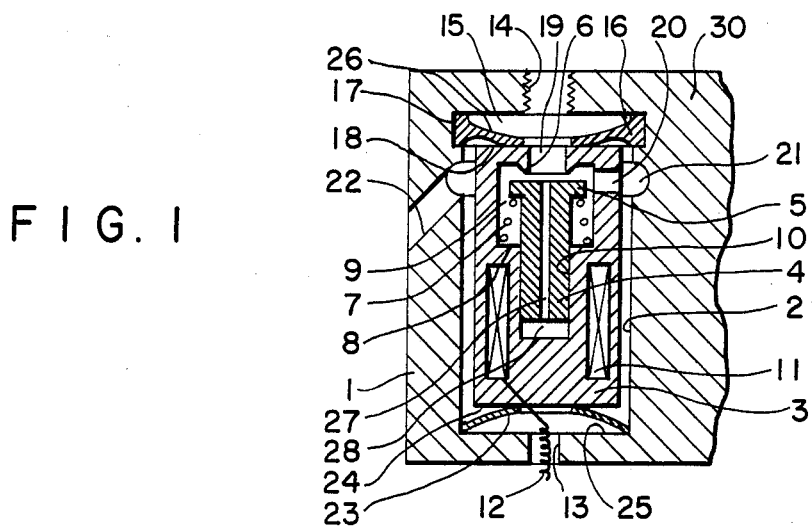
FIG. 1 is a longitudinal cross-section of a valve embodying an example of the present invention.

The electromagnetic solenoid valve illustrated in FIG. 1 includes a hydraulic unit 1 with a cylindrical chamber 2 in which a movable valve body 3 is housed. A ferromagnetic stem 4 is arranged to be displaceable in an axial direction in a bore 10 in the body 3, and carries a fluid flow damper 5 cooperating with a seat 6, in the body 3, to form a fluid sealing surface. The seat 6 and the bore 10 are equal in cross-section diameter. The magnetic stem 4 is urged toward its valve closed position wherein the damper 5 contacts the seat 6 by a coaxial spring 7 having one end on the damper 5 and the other end on a shoulder 8 within a chamber 9 in the body 3. An electrical coil 11 is housed in the body 3 and is arranged to be selectively connected to a power source, not illustrated, by a wire 12, passing through an opening 13 in the unit 1. The energized coil 11 produces a magnetic field under the effect of which the ferromagnetic stem 4 is displaced from a closed position (F) to an open position (O), against the action of the spring 7. The unit 1 has a fluid intake pipe 14 for admitting a pressurized fluid. The intake pipe 14 leads into a chamber 15 in the unit 1, separated from the cylindrical chamber 2 by an annular elastic joint member 16. An outer edge of joint 16 is inserted into a peripheral groove 17 in the chamber 15 and an inner surface of the joint 16 rests against the adjacent side 18 of the valve body 3. The valve body has a fluid intake conduit 19, placed opposite the intake pipe 14 and surrounded by the inner rim 26 of the flexible joint 16.

The seat 6 is formed by an annular flange on the body 3, located on the inner end of the intake conduit 19. The chamber 9 surrounding the magnetic stem 4 is connected with the cylindrical chamber 2 through a fluid outlet conduit 20, consisting of a lateral bore in the body 3. The unit 1 has an annular groove 21, located opposite the outlet conduit 20 and communicating with a fluid outlet pipe 22. A compression spring 23, consisting of an elastic band in the form of a washer, is placed between the side 24 of the valve body 3 and the base wall 25 of the chamber 2. The spring 23 urges the body 3 in an axial direction against the action of the pressurized fluid penetrating into the chamber 15 through the pipe 14. This constitutes an elastic suspension for the valve body 3 in the cylindrical chamber 2 of the unit 1. The washer 23 also provides a fluid-tight seal to the body 3 to enable the hole 13 for the wire 12 to be separated from the rest of the cylindrical chamber 2. The stem 4 has a central bore 27 connecting the intake conduit 19 with a chamber 28, placed on the side opposite the side of the stem 4 carrying the damper 5. The stem 4 thereby is not subject to hydraulic forces capable of altering its position, which is defined only by the exciting current in the coil 11 and by the return force of the spring 7.

Figure 2:
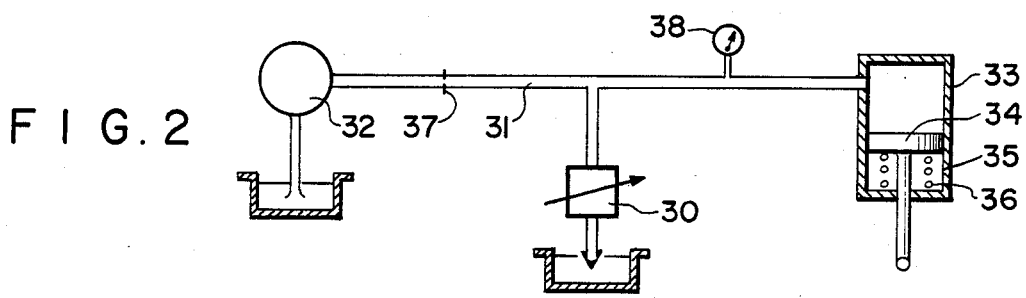
FIG. 2 shows a fluid pipeline installation having a pressure regulating valve.

As shown in FIG. 2, an electromagnetic valve 30 such as described above may be installed as a bypass for a pipe 31 connecting a pumping station 32 to user equipment 33, shown schematically by a piston 34 sliding in a cylinder 35 against the action of a spring 36. The pipe 31 has a restriction or choke 37, fitted upstream of the valve 30. A pressure gage 38 is connected to the pipe 31 toward the user hookup to enable a measurement of the pressure and a control of the valve 30 through a control unit (not illustrated).

Figure 3:
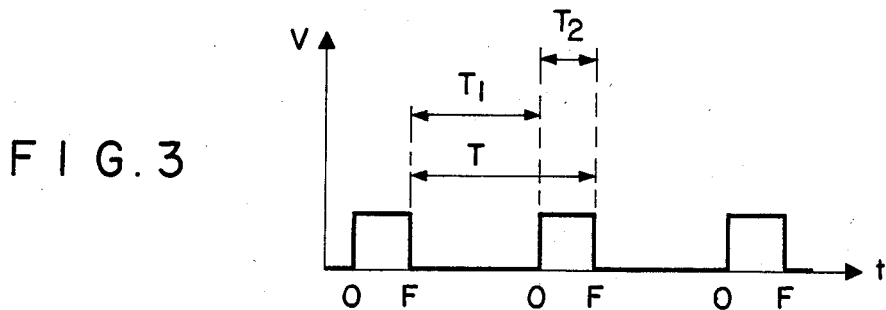
FIG. 3 illustrates a waveshape diagram showing the valve under energization in terms of time t.

As illustrated in FIG. 3, the coil 11 in the valve 30 is supplied current for a predetermined period T by applying a voltage V thereto for a variable time $T_2$, in terms of the desired pressure. Energization of the coil 11 produces a displacement of the electromagnetic stem 4 against the action of the spring 7 and opens the valve to allow a given quantity of pressurized liquid to escape from the pipe 31. When the coil power is interrupted, the valve remains closed during the deenergized state of coil 11, e.g., for a time $T_1$.

Figure 4:
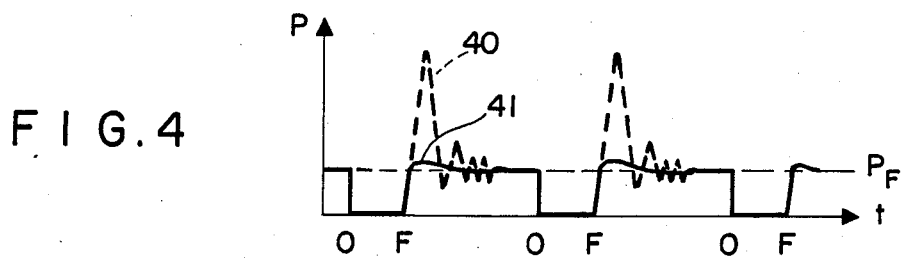
FIG. 4 shows a diagram expressing the instantaneous pressure P in the pipeline in terms of time.

The diagram in FIG. 4 illustrates the pressure variations in the pipe 31 with the closing "F" and the opening "O" of an electromagnetic regulating valve. The broken line drawing 40 illustrates the case of an ordinary valve with no device to eliminate water hammer. Immediately after the closing F, a considerable pressure rise occurs, attenuating in a damped wave to become stabilized at a given pressure $P_F$, depending on the power to be supplied through the user device 33. On the other hand, using the valve according to the present invention the water hammer is eliminated, as shown by the solid line curve 41 in FIG. 4. Accordingly, with the closing of the valve, when the pressure $P_F$ is attenuated, the shock wave due to the inertia of the flowing liquid is almost totally damped by the retraction of the valve body 3 into the cylindrical chamber 2, against the action of the spring 23. The flowing liquid is thus immobilized gradually at the intake of the valve 30. Thereby the valve according to the invention enables a clearly linear control of the mean pressure P in the pipe 31 (FIG. 2), acting on the ration $T_1/T$.

Figure 5:
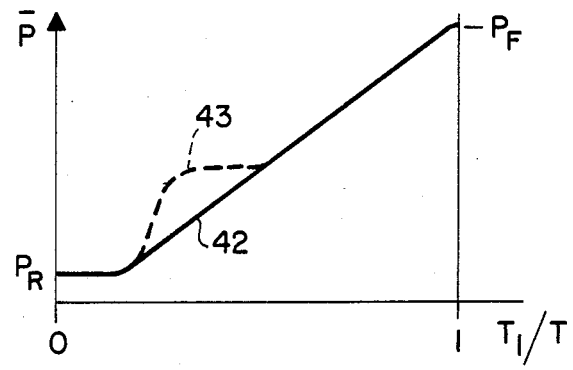
FIG. 5 is a diagram relating the mean pressure P in the pipeline in terms of the ratio of the valve closed time $T_1$ to a full valve cycle time T.

The control of the mean pressure in the pipe 31 is illustrated in FIG. 5. The variation of the mean pressure P in terms of the ratio $T_1/T$ is clearly linear for the valve according to the present invention to eliminate the water hammer as illustrated by the straight solid line 42, connecting a residual pressure $P_R$ in the pipe 31, when the valve is open to the pressure $P_F$, corresponding to the closed state of the regulating valve. By comparison, a curve 43 has been indicated by a broken line, illustrating the considerable mean pressure rise due to water hammer for low $T_1/T$ ratio values. Therefore, there is for ordinary valves, a non-linear relationship between the mean pressure and the $T_1/T$ ratio. This considerably complicates fluid control with those valves, which require the establishment of precise gaging curves. Such gaging work is unnecessary with the valve according to the present invention since the fluid control is subject to a clearly linear function.

Figure 6:
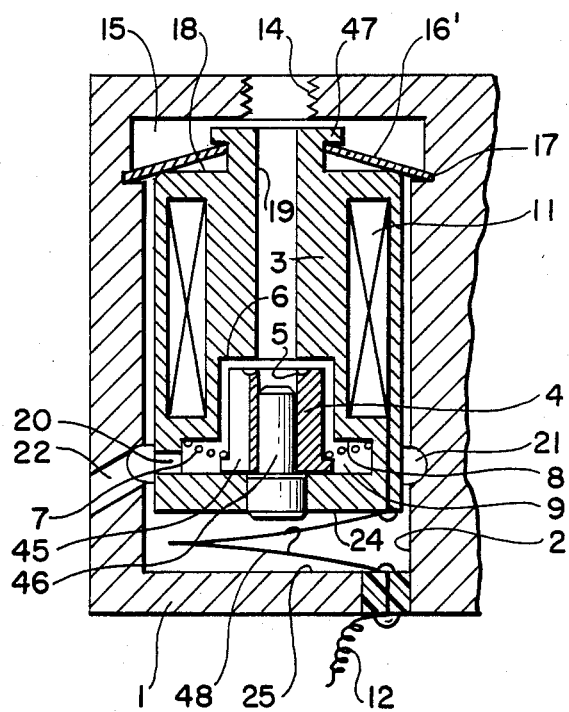
FIG. 6 is a longitudinal cross-section of a modification of the valve shown in FIG. 1.

In the form of the valve described in FIG. 1, the valve is in closed position, in the absence of a coil exciting current. FIG. 6, on the other hand, shows a valve open in the absence of coil exciting current. In FIG. 6, the elements corresponding to those shown in FIG. 1 bear the same reference numbers. Thus, a valve body 3 is housed, in a slideably movable fashion, in a cylindrical chamber 2 of a hydraulic unit 1. The ferromagnetic stem 4 has a longitudinal slot 45 and is urged by a spring 7 toward its open position. The stem 4 is guided in its movement by a central guide 46 formed in one piece with the valve body 3. The elastic joint 16' separating the intake pipe 14 from the outlet pipe 22 is shown in the form of an elastic wasber, connecting a protruding central portion or collar 47 of the body 3 to a wall of the cylindrical chamber. That washer also acts as an elastic or spring device, urging the body 3 in an axial direction, against the action of the incoming pressurized fluid. The intake conduit 19 consists of a central bore in the valve body 3. A folded metal band 48 is placed between the lower side 24 of the body 3 and the base wall 25 of the chamber 2, and electrically connects the coil 11 to the electrical feed wire 12. It should be noted that modifications of the illustrated examples of the present invention may occur to those skilled in the art without departing from the scope of the present invention. For example, the outlet conduit and pipe could be situated axially and fluid-tight bellows joints could be placed between the intake/outlet pipe and the intake/outlet conduit. The washer-like spring 23 could, in that latter case, be replaced by an adjustable spiral spring.

Accordingly, it may be seen that there has been provided, in accordance with the present invention, an improved solenoid valve.

The embodiments of the invention in which an exclusive property or privilege is claimed are defined as follows:

1. A solenoid valve including a valve body, a fluid inlet conduit, a fluid outlet conduit, a seat between said conduits, a magnetic field coil, and a fluid flow damper selectively displaceable in an axial direction in a bore in the body under the effect of a magnetic field produced by an energization of the electrical coil and cooperating with the seat in the body between the fluid inlet conduit and the fluid outlet conduit provided in the body to form a fluid sealing surface, characterized by a valve housing containing the valve body, the fluid inlet conduit, the fluid outlet conduit, the seat between the conduits and the magnetic field coil and having an internal cylindrical chamber in which the valve body is housed in a displaceable manner along said axial direction; a fluid inlet pipe and a fluid outlet pipe for said cylindrical chamber; and at least one elastic joint tightly uniting the wall of the cylindrical chamber and said valve body so as to separate said inlet conduit and inlet pipe from said outlet conduit and outlet pipe.

2. A valve according to claim 1, further characterized by the said joint being united with the valve body in the proximity of its intake conduit and including an elastic means between said body and said chamber to urge said body in said axial directions against the pressure of an intake fluid.

3. A valve according to claim 2, further characterized by said joint defining, in the portion of the cylindrical chamber between the intak pipe and conduit, an operating chamber connected to the intake pipe for displacement of the valve body under the action of the intake liquid, against the action of the said elastic means when the valve is closed.

4. A valve according to claim 1, in which the outlet conduit consists of at least one lateral bore in the valve body, and further characterized by said cylindrical chamber having an annular groove, placed opposite the bore, that groove communicating with said outlet pipe.

5. A valve according to claim 1, further characterized by the intake pipe and conduit being placed axially on a first side of said cylindrical chamber and by said elastic means including a compression spring, placed between said body and a wall of the side opposite the first side of said cylindrical chamber.

6. A valve according to claim 1 where said coil is supplied current for a period T, further characterized by an operation of the valve being done according to a clearly linear function between the inlet fluid pressure and the ratio of the valve closed time $T_1$ and the total valve cycling period T.

7. A valve according to claim 2, further characterized by said elastic means being a compression spring.

8. A valve according to claim 1, further characterized by said elastic joint being an elastic washer.

9. A valve according to claim 2, further characterized by said elastic means being an elastic washer.

10. A valve according to claim 8, further characterized by a second washer between said body and said chamber to urge said body in said axial direction.

11. A valve according to claim 1 and further characterized by a spring means urging said flow damper against said seat in opposition toa pressure of an intake fluid.

12. A valve according to claim 1 and further characterized by a spring means urging said flow damper away from said seat in cooperation with a pressure of an intake fluid.

* * * * *